US012681617B2

(12) United States Patent
Wei et al.

(10) Patent No.: US 12,681,617 B2
(45) Date of Patent: Jul. 14, 2026

(54) INTERACTION METHOD, APPARATUS, ELECTRONIC DEVICE AND STORAGE MEDIUM

(71) Applicant: Beijing Zitiao Network Technology Co., Ltd., Beijing (CN)

(72) Inventors: Mingxin Wei, Beijing (CN); Shiman Shi, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 182 days.

(21) Appl. No.: 18/573,120

(22) PCT Filed: Sep. 28, 2022

(86) PCT No.: PCT/CN2022/122074
§ 371 (c)(1),
(2) Date: Dec. 21, 2023

(87) PCT Pub. No.: WO2023/065997
PCT Pub. Date: Apr. 27, 2023

(65) Prior Publication Data
US 2024/0345693 A1       Oct. 17, 2024

(30) Foreign Application Priority Data
Oct. 18, 2021     (CN) .......................... 202111212148.8

(51) Int. Cl.
*A63F 13/537*        (2014.01)
*G06F 3/0481*        (2022.01)
(Continued)

(52) U.S. Cl.
CPC .......... *G06F 3/0481* (2013.01); *A63F 13/537* (2014.09); *G06F 3/04842* (2013.01); *G06F 3/1423* (2013.01)

(58) Field of Classification Search
CPC .. G06F 3/0481; G06F 3/04842; G06F 3/1423; G06F 13/5378; A63F 13/537; A63F 13/5372
See application file for complete search history.

(56) References Cited

U.S. PATENT DOCUMENTS

2022/0410007 A1* 12/2022 Jia ........................... A63F 13/56
2024/0340503 A1* 10/2024 Sun .................... H04N 21/4312

FOREIGN PATENT DOCUMENTS

CN       109064528 A       12/2018
CN       111243357 A       6/2020
(Continued)

OTHER PUBLICATIONS

Bektur Ryskeldiev et al., ReactSpace: Spatial-Aware User Interactions for Collocated Social Live Streaming Experiences, Oct. 1, 2018, IEEE International Conference on Systems—Man—and Cybernetics, pp. 728-732 (Year: 2018).*
(Continued)

*Primary Examiner* — Tam T Tran
(74) *Attorney, Agent, or Firm* — Astute IP Law Group

(57) ABSTRACT

The present disclosure relates to an interaction method and apparatus, electronic device and storage medium. The method includes: displaying a first target content, the first target content including a first object associated with a first user, and the first target content being posted by the first user; in response to a first preset operation triggered for the first target content, displaying a second target content, the second target content including a second object associated with the first object.

20 Claims, 11 Drawing Sheets

Displaying a first target content, the first target content including a first object associated with a first user, and the first target content being posted by the first user — 110

In response to a first preset operation triggered for the first target content, displaying a second target content, the second target content including a second object associated with the first object — 120

(51) Int. Cl.
    *G06F 3/04842*    (2022.01)
    *G06F 3/14*     (2006.01)

(56)          References Cited

FOREIGN PATENT DOCUMENTS

| CN | 111580724 A | 8/2020 |
|----|-------------|--------|
| CN | 112601100 A | 4/2021 |
| CN | 112783591 A | 5/2021 |
| CN | 113031842 A | 6/2021 |
| CN | 113115114 A | 7/2021 |
| CN | 113179446 A | 7/2021 |
| CN | 113867593 A | 12/2021 |
| CN | 113867593 B | 10/2024 |

OTHER PUBLICATIONS

Ryo Yonetani et al., Recognizing Micro-Actions and Reactions from Paired Egocentric Videos, Jun. 1, 2016, IEEE Conference on Computer Vision and Pattern Recognition, pp. 2629-2638 (Year: 2016).*

Notification of granting patent right for Chinese Patent Application No. 202111212148.8, mailed on Sep. 5, 2024, 9 pages.

* cited by examiner

Displaying a first target content, the first target content including a first object associated with a first user, and the first target content being posted by the first user ~~110

In response to a first preset operation triggered for the first target content, displaying a second target content, the second target content including a second object associated with the first object ~~120

FIG. 1

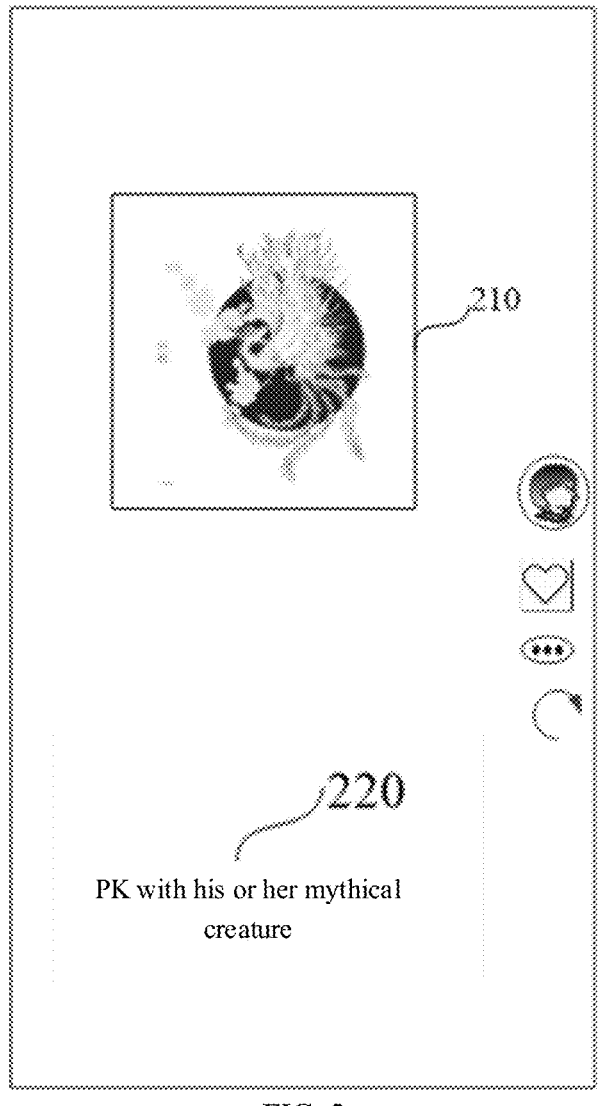

PK with his or her mythical creature

FIG. 2

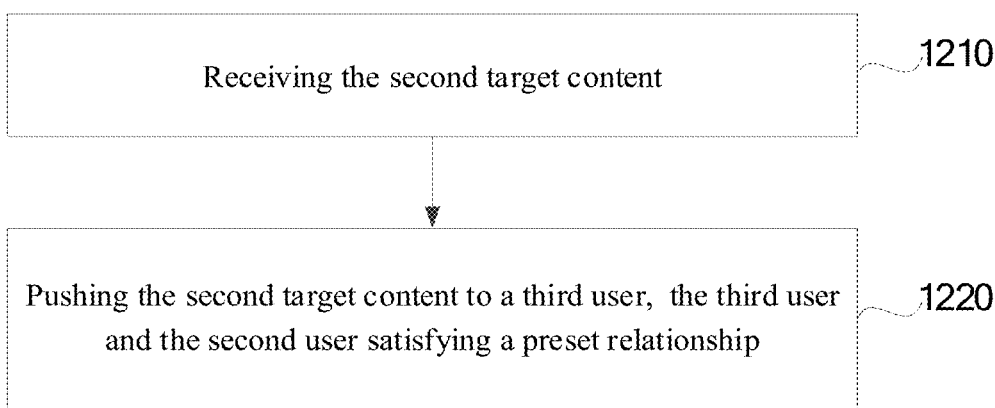
FIG. 11
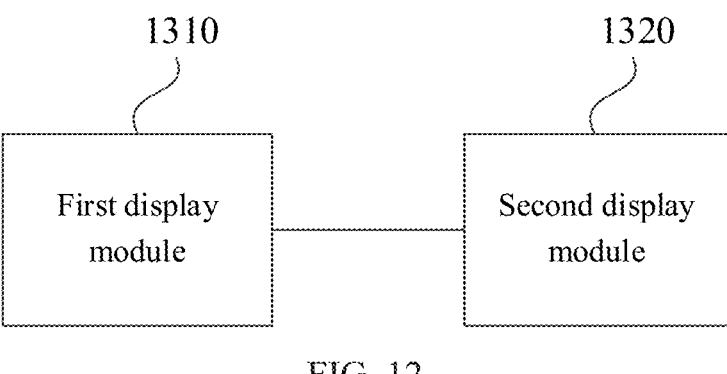
FIG. 12
FIG. 13

INTERACTION METHOD, APPARATUS, ELECTRONIC DEVICE AND STORAGE MEDIUM

CROSS REFERENCE TO RELATED APPLICATIONS

This is a national stage application filed under 37 U.S.C. 371 based on International Patent Application No. PCT/CN2022/122074, filed Sep. 28, 2022, which claims priority to Chinese Patent Application No. 202111212148.8, filed on Oct. 18, 2021, entitled "an interaction method, apparatus, electronic device and storage medium", the disclosures of which are incorporated herein by reference in their entireties.

TECHNICAL FIELD

Embodiments of the present disclosure relate to an interaction method, apparatus, electronic device and storage medium.

BACKGROUND

With the rapid development of terminal technologies and network technologies, more and more video applications have emerged. By the video applications, users may browse various interesting videos, and the users may also create and post exciting videos by the video applications.

SUMMARY

In order to solve the above technical problem or at least partially solve the above technical problem, embodiments of the present disclosure provide an interaction method, an apparatus, an electronic device, and a storage medium, as to enrich the interaction ways between different users.

In the first aspect, the embodiments of the present disclosure provide an interaction method, which is applied to a client of a second user, the method comprises:

displaying a first target content, wherein the first target content comprises a first object associated with a first user, and the first target content is posted by the first user; and in response to a first preset operation triggered for the first target content, displaying a second target content, wherein the second target content comprises a second object associated with the first object.

In the second aspect, the embodiments of the present disclosure provide a content distribution method, which is applied to a server, used for processing a second target content in the above interaction method, and the method comprises:

receiving the second target content;

pushing the second target content to a third user, wherein the third user and the second user satisfy a preset relationship.

In the third aspect, the embodiments of the present disclosure provide an interaction apparatus, which is integrated into a client of a second user, and the apparatus comprises:

a first display module, configured to display a first target content, wherein the first target content comprises a first object associated with a first user, and the first target content is posted by the first user; and a second display module, configured to, in response to a first preset operation triggered for the first target content, display a second target content, wherein the second target content comprises a second object associated with the first object.

In the fourth aspect, the embodiments of the present disclosure provide a content distribution apparatus, which is used for processing a second target content in the above interaction method, is integrated into a server, and the apparatus comprises:

a receiving module, configured to receive the second target content; and a pushing module, configured to push the second target content to a third user, wherein the third user and the second user satisfy a preset relationship.

In the fifth aspect, the embodiments of the present disclosure provide an electronic device, the electronic device comprises:

one or more processors; and a storage apparatus, configured to store one or more programs;

when the one or more programs are executed by the one or more processors, the one or more processors are caused to implement the above method.

In the sixth aspect, the embodiments of the present disclosure provide a computer-readable storage medium, on which a computer program is stored, the above method is achieved when the program is executed by a processor.

BRIEF DESCRIPTION OF THE DRAWINGS

Drawings are used to provide further understanding of the present invention and form a part of the description. Together with embodiments of the present invention, it is used to explain the present invention and does not constitute limitations on the present invention. In the drawings:

FIG. 1 is a flow diagram of an interaction method in embodiments of the present disclosure;

FIG. 2 is a schematic diagram of an interface for displaying a first target content in embodiments of the present disclosure;

FIG. 11 is a flow schematic diagram of a content distribution method in embodiments of the present disclosure;

FIG. 12 is a schematic structural diagram of an interaction apparatus in embodiments of the present disclosure;

FIG. 13 is a schematic structural diagram of a content distribution apparatus in embodiments of the present disclosure.

DETAILED DESCRIPTION

Figure 3:
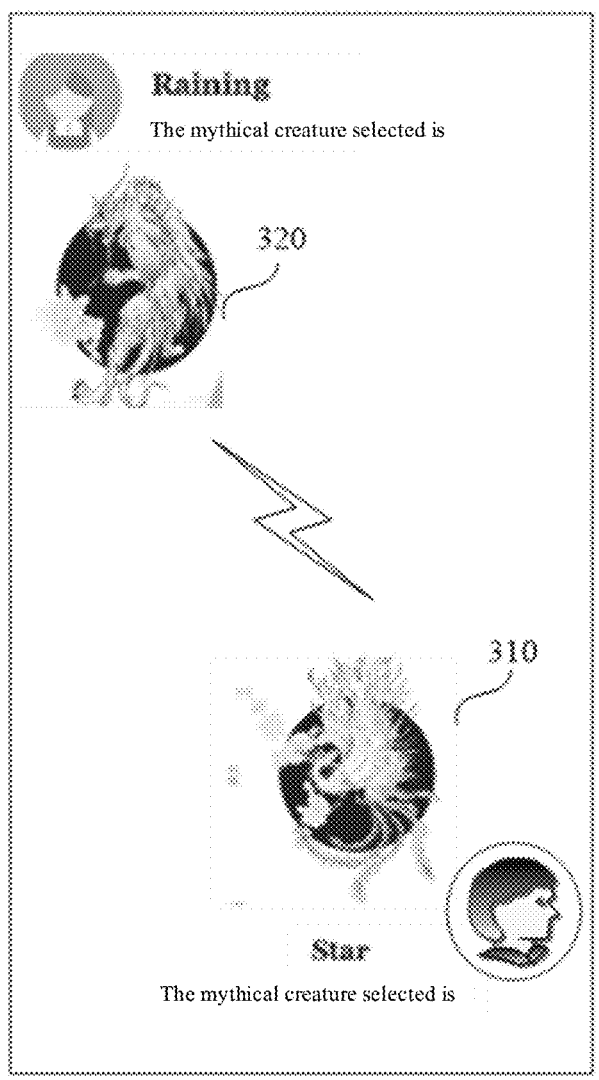
FIG. 3 is an interface for player killing (PK) between a first object and a second object in embodiments of the present disclosure.

Embodiments of the present disclosure may be described in more detail below with reference to drawings. Although certain embodiments of the present disclosure are shown in the drawings, it should be understood that the present disclosure may be achieved in various forms and should not be construed as limited to the embodiments described here. On the contrary, these embodiments are provided to understand the present disclosure more thoroughly and completely. It should be understood that the drawings and embodiments in the present disclosure are only for illustrative purposes and are not intended to limit the scope of protection of the present disclosure.

It should be understood that various steps recorded in implementation modes of the method of the present disclosure may be executed in different orders and executed in parallel. In addition, the implementation modes of the method may include additional steps and/or steps omitted or unshown. The scope of the present disclosure is not limited in this regard.

The term "including" and its variations used in this article are open-ended including, namely "including but not limited to". The term "based on" refers to "at least partially based on". The term "one embodiment" represents "at least one embodiment"; the term "another embodiment" represents "at least one other embodiment"; and the term "some embodiments" represents "at least some embodiments". Relevant definitions of other terms may be given in the following description.

It should be noted that the concepts such as "first" and "second" mentioned in the present disclosure are only used to distinguish different apparatuses, modules or units, and are not intended to limit orders or interdependence relationships of functions performed by these apparatuses, modules or units.

It should be noted that the modifications of "one" and "more" mentioned in the present disclosure are schematic rather than restrictive, and those skilled in the art should understand that unless otherwise explicitly stated in the context, it should be understood as "one or more".

The names of messages or information interacted between a plurality of apparatuses in the implementation of the present disclosure are for illustrative purposes only and are not intended to limit the scope of these messages or information.

There is a relatively limited way currently for the different users to interact based on the video applications.

Therefore, the ways in which different users interact based on the video applications still need to be further enriched.

FIG. 1 is a flow diagram of an interaction method in an embodiment of the present disclosure. The method may be executed by an interaction apparatus. The apparatus may be achieved by using a mode of software and/or hardware, and the apparatus may be configured in an electronic device, such as a display terminal, specifically including but not limited to the electronic device with a display screen such as a smart phone, a handheld computer, a tablet computer, a portable wearable device, and a smart home device (such as a desk lamp).

As shown in FIG. 1, the method may specifically include the following steps:

Step 110, displaying a first target content, the first target content comprises a first object associated with a first user, and the first target content is posted by the first user.

The first target content may be a video content, posted by the first user and played by a video application on a second user terminal, and the first object is a target object in the video content. Specifically, the first target content may be played on a home interface or a friend interface of the video application on the second user terminal. It may be understood that the first user may be a friend of the second user in the video application, namely the first user and the second user satisfy a preset relationship (the preset relationship is a friend relationship). Alternatively, the first target content posted by the first user is more exciting or highly popular, and therefore it is pushed to the video application of the second user for playing.

The first object associated with the first user may be a certain interaction role selected by the first user. For example, it is a certain mythical creature or a certain character in a game. The first object may also be a certain competition topic selected by the first user, such as an idiom relay, and a common sense test.

In some embodiments, the first user may enter an object selection interface by an active interface played in the form of a video in the video application, then select the first object based on the object selection interface, and post the first target content including the first object. In other embodiments, the first user may also enter the object selection interface by the target content posted by other users (for example a third user), then select the first object based on the object selection interface, and post the first target content including the first object. The target content posted by the other users (for example the third user) is played in the form of the video in the video application of the first user. It may be understood that the third user may be a friend of the first user in the video application, namely the first user and the third user satisfy the preset relationship (the preset relationship is the friend relationship). Alternatively, the target content posted by the third user is more exciting or highly popular, and therefore it is pushed to the video application of the first user for playing.

Step 120, in response to a first preset operation triggered for the first target content, in response to a first preset operation triggered for the first target content, displaying a second target content, the second target content comprises a second object associated with the first object.

The second object associated with the first object may be an object automatically generated by a preset algorithm based on the first object. The preset algorithm, for example, generates the second object that belongs to the same category as the first object according to the category of the first object. For example, in a certain game that only includes two game characters, the first object is one game character, and it may be determined by the preset algorithm that the second object is another game character. Alternatively, the second object that belongs to the same set as the first object is generated according to a set in which the first object is located.

The first preset operation triggered for the first target content may be an operation interacted with an interface displaying the first target content by a preset gesture. For example, an operation of sliding leftwards, rightwards, upwards, or downwards to display the interface of the first target content.

In some embodiments, the first preset operation may also be an operation that triggers a certain control, and the first target content includes the control.

Compared with the prior art, the technical solution provided by the embodiments of the present disclosure has at least the following advantages:

The interactive method provided by the embodiment of the present disclosure, displaying a first target content, the first target content comprises a first object associated with a first user, and the first target content is posted by the first user. In response to a first preset operation triggered for the first target content, displaying a second target content. The second target content comprises a second object associated with the first object, which enriches the interaction between different users.

The interaction method provided in the embodiments of the present disclosure may be applied to a terminal of the second user, and it may be specifically applied to a video application installed on the terminal of the second user. By displaying the first target content on the video application of the second user terminal, the first target content is posted by the first user and includes the first object associated with the first user. When the second user sees the first target content, it may interact with the first user by the first target content. For example, if the first preset operation is triggered for the first target content, the second target content including the second object is displayed in the video application of the second user, and the second object is associated with the first object. Thus, the ways in which different users interact by the video application are enriched.

Further, in some embodiments, the second target content further includes the first object, so that the second object interacts with the first object. Specifically, the second target content may be an image of the first object interacting with the second object. In other words, the second target content is an interaction process interacted between the first object and the second object, namely the second target content is a content changed dynamically, such as a video with a certain special effect. Specifically, if the first object and the second object are two characters participating in player killing (PK) (namely fighting) respectively, the second target content may be an image of PK between the first object and the second object. For example, the first object and the second object are two different characters in the preset set, and the second target content may be an image of the two characters fighting.

In some embodiments, the second target content further includes interaction information between the first object and the second object. The interaction information, such as result information of PK between the first object and the second object, such as indication information for "losing" or "winning", or score information. In order to improve the display effect, the second target content may be a video content with some special effects (such as an audio special effect, and a text sticker), and the second object is a target object in the video content.

For another example, the first object and the second object may also be test questions. The first user and the second user may conduct PK by the test questions, and a PK result may be contained in the second target content.

Further, in some embodiments, if the interaction information is the result information of PK between the first object and the second object, the interaction method further includes: in response to a triggering on a preset control, the interaction information interacted again between the first object and the second object is regenerated, herein the second target content includes the preset control. Namely, if the second user does not satisfy with the result information of PK, it may proceed with another PK. Two parties participating in PK are the first object and the second object.

The first object may be understood as a representative of the first user, and the second object is a representative of the second user. Therefore, the PK between the first object and the second object is essentially a PK between the first user and the second user, thus interaction playing methods between the different users are enriched.

In some embodiments, in response to a first preset operation triggered for the first target content, the second target content is displayed, including: in response to the triggering on the first target content, a selection interface of the second object is displayed; and in response to a selecting for the second object based on the selection interface, the second target content is displayed. Namely the second object is an object independently selected by the second user based on the object selection interface. The triggering on the first target content may be an operation interacted with an interface displaying the first target content by a preset gesture. For example, an operation of sliding leftwards, rightwards, upwards, or downwards to display the interface of the first target content; and it may also be an operation that triggers a preset control, and the first target content includes the preset control.

In response to the triggering on the first target content, the selection interface of the second object is displayed, including: in response to a triggering on a preset inlet, a first interface is displayed according to information of the second user, the first target content includes the preset inlet, and if the information of the second user is preset information, the first interface is the selection interface of the second object, and the preset information may be a second object that is not associated with the second user yet.

In some embodiments, the interaction method further includes:

in response to a second preset operation triggered for the second target content, the second target content is posted, the second target content is configured to support a third user to generate an interaction content based on the second object. For example, if the second target content includes the result information of PK between the first object and the second object, the second user may post the second target content (specifically, the second target content is uploaded to a server by the video application of the second user terminal, and the server may push the second target content to the third user), as to guide other users (such as the third user) to interact with the second object by the second target content, or generate the interaction content based on the second object. Namely, after the second user posts the second target content, the second target content may be displayed in the video applications of the other users. The second target content includes the second object associated with the second user, and the second target content is posted by the second user. At this moment, the second target content is equivalent to the above first target content, and the other users continue to interact with the second user according to the interaction logic mentioned above. It may be understood that all users except for the second user may be the third user, so the third user and the first user may be the same user.

The above interaction method is further described in combination with specific application scenes. It is assumed that the first object is a mythical creature A in the preset set, on the home interface and/or the friend interface (dynamic information about a user who is a friend with the second user is only displayed on the friend interface, such as a work posted by the user. The video content that is highly popular or interested by the second user is displayed on the home interface, including not only the work posted by the user who is the friend with the second user, but also the work posted by the user who is not the friend with the second user) of the video application of the second user, the first target content is displayed. The first target content is the video content, and the first target content is posted by the first user. As shown in FIG. 2, the first target content includes the first object (mythical creature A) 210 associated with the first user, the first control ("PK with Ta's mythical creature") 220, and some other identifiers (such as "attention", "like", "comment", "prop", and "forward"). When the second user triggers the first control ("PK with Ta's mythical creature") 220, a next level interface is displayed according to information of the second user. If the information of the second user is that the second user already has the mythical creature in the preset set (such as the mythical creature B), the next level interface displayed is an interface on which the first object and the second object are PK as shown in FIG. 3, namely when the second user triggers the first control ("PK with Ta's mythical creature") 220, the second target content is displayed. The second target content includes the interaction information between the first object (mythical creature A) 310 and the second object (mythical creature B) 320. The interface shown in FIG. 3 may be dynamic, such as a video of the mythical creature A and the mythical creature B fighting, and this video may generate a personalized presentation mode according to the different first and second users.

Figure 4:
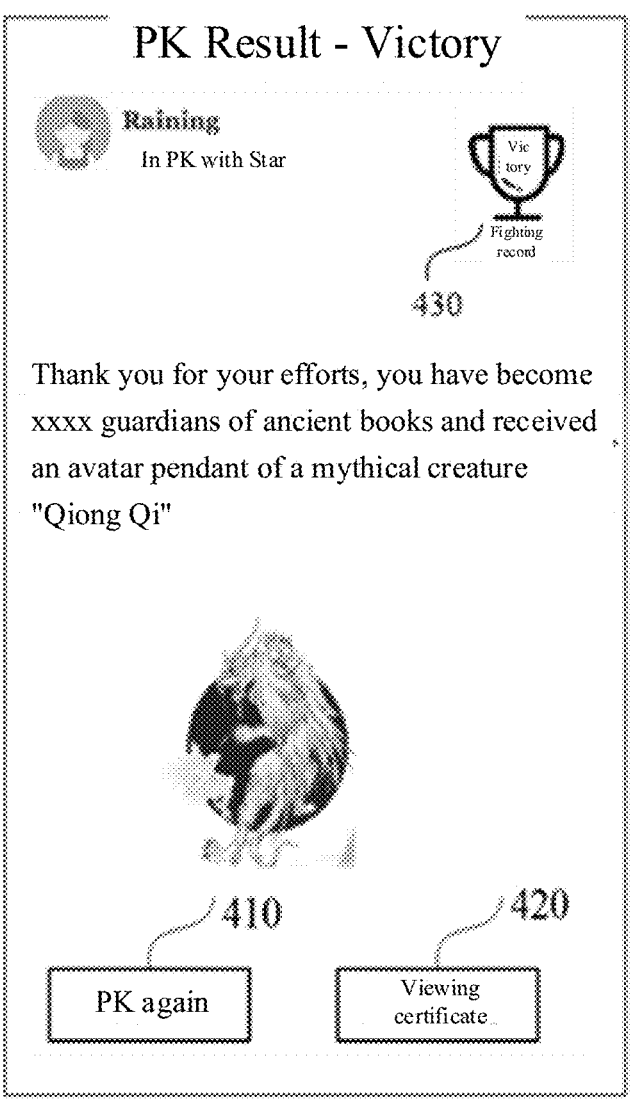
FIG. 4 is a schematic diagram of a PK result interface in embodiments of the present disclosure.
Figure 5:
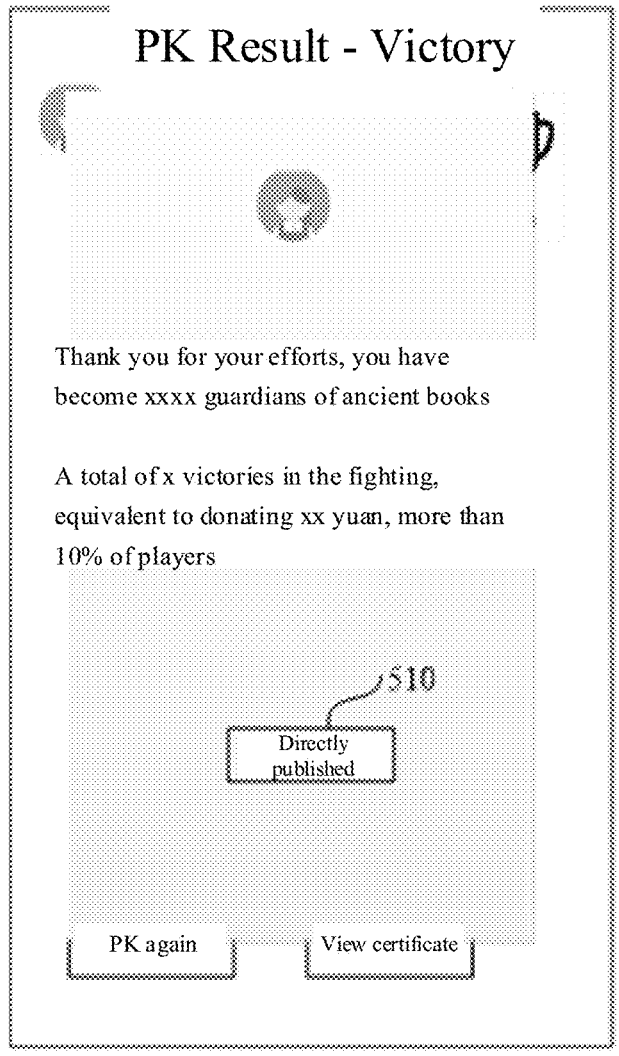
FIG. 5 is a schematic diagram of a certificate detail interface in embodiments of the present disclosure.
Figure 6:
FIG. 6 is a schematic diagram of a fighting record interface in embodiments of the present disclosure.

When the fighting between the mythical creature A and the mythical creature B ends, if the mythical creature B of the second user defeats the mythical creature A of the first user, a PK result interface shown in FIG. 4 may be displayed. On the PK result interface, a second control (PK again) 410, a third control (viewing certificate) 420, and a fourth control (fighting record) 430 may be displayed. If the second user triggers the second control (PK again) 410, it returns to the interface shown in FIG. 3, namely the interaction information interacted again between the first object (mythical creature A) and the second object (mythical creature B) is regenerated. If the second user triggers the third control (viewing certificate) 420, a detail interface as shown in FIG. 5 is displayed, which includes a preset copy. Exemplarily, the interaction in this embodiment is associated with a public welfare activity, and after the second user completes the video interaction with the first user, an application platform may make a donation to the public welfare activity in the name of the second user. Optionally, the number of the donations is related to an interaction result of the second user. As shown in FIG. 5, a fifth control 510 (directly posted) is further displayed on the detail interface. If the second user triggers the fifth control 510 (directly posted), an existing interface may be posted, as to enrich playing methods of the user. If the second user triggers the fourth control (fighting record) 430, a fighting record interface shown in FIG. 6 is displayed, on which fighting information participated by the second user is displayed, including those actively initiated by the second user and passively invited. In a failed fighting information bar, a "revenge" control is displayed, and used to initiate another PK.

Figure 7:
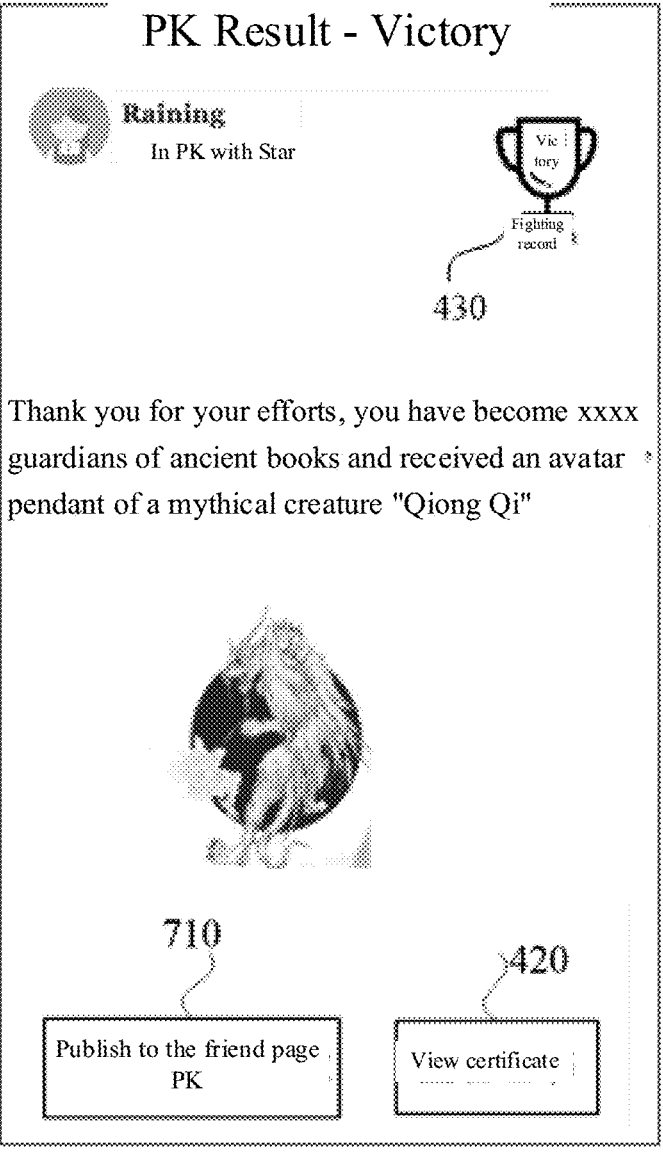
FIG. 7 is a schematic diagram of a PK result interface in embodiments of the present disclosure.

When the fighting between the mythical creature A and the mythical creature B ends if the mythical creature B of the second user defeats the mythical creature A of the first user, the PK result interface displayed may also be as shown in FIG. 7, which includes a sixth control (posted to the friend interface PK) 710. If the second user triggers the sixth control (posted to the friend interface PK) 710, the content including the second object may be processed into a work for posting. The content including the second object may include the dynamic process interacted between the first object and the second object, and the interaction information between the first object and the second object (such as a PK result) and the like.

Figure 8:
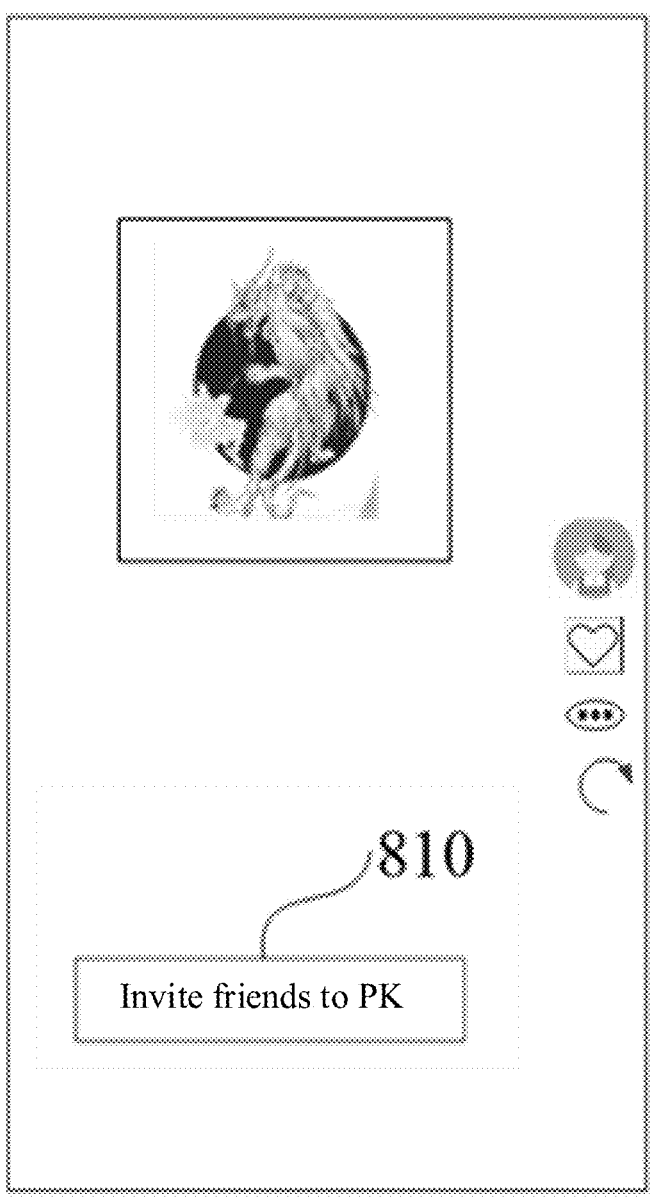
FIG. 8 is a schematic diagram of a work displayed in a video application of a second user in embodiments of the present disclosure.
Figure 9:
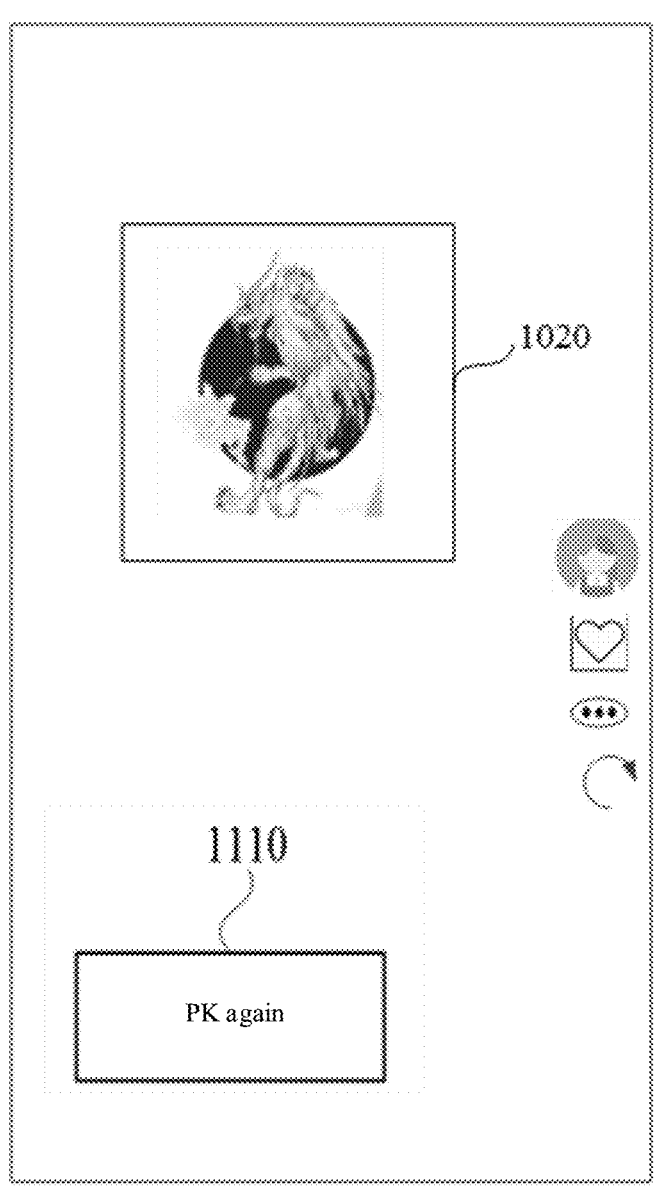
FIG. 9 is a schematic diagram of a work displayed in a video application of other users in embodiments of the present disclosure.

Optionally, after the posting is completed, the work displayed in the video application of the second user is shown in FIG. 8, which includes a seventh control (inviting friends to PK) 810. If the second user triggers the seventh control (inviting friends to PK) 810, a specific friend may be selected, and a private message is sent to the friend, as to invite the friend to PK, for example, it is jumped to a conversation interface for sharing. The work displayed in the video applications of other users is shown in FIG. 9, which includes an eighth control ("PK with Ta's mythical creature") 1010, the second object (mythical creature B) 1020 associated with the second user, and some other identifiers (such as "attention", "like", "comment", and "prop"). The other users (such as the third user) may PK with the second object (mythical creature B) of the second user based on the eighth control ("PK with Ta's mythical creature") 1010. If the third user triggers the eighth control ("PK with Ta's mythical creature") 1010, a next level interface is displayed according to information of the third user. If the information of the third user is that the third user already has a mythical creature (such as a mythical creature C) in the preset set, the next level interface displayed is a interface on which the third object (mythical creature C) and the second object (mythical creature B) are PK. Namely, when the third user triggers the eighth control ("PK with Ta's mythical creature") 1010, the second target content is displayed, the second target content includes interaction information between the third object (mythical creature C) and the second object (mythical creature B), and the above interaction logic is repeated. It may be understood that the third user may be the first user, and the mythical creature C may be the mythical creature A. Namely, in response to the second preset operation triggered for the second target content, the second target content is posted. The second target content is configured to support the third users to generate the interaction content based on the second object.

Figure 10:
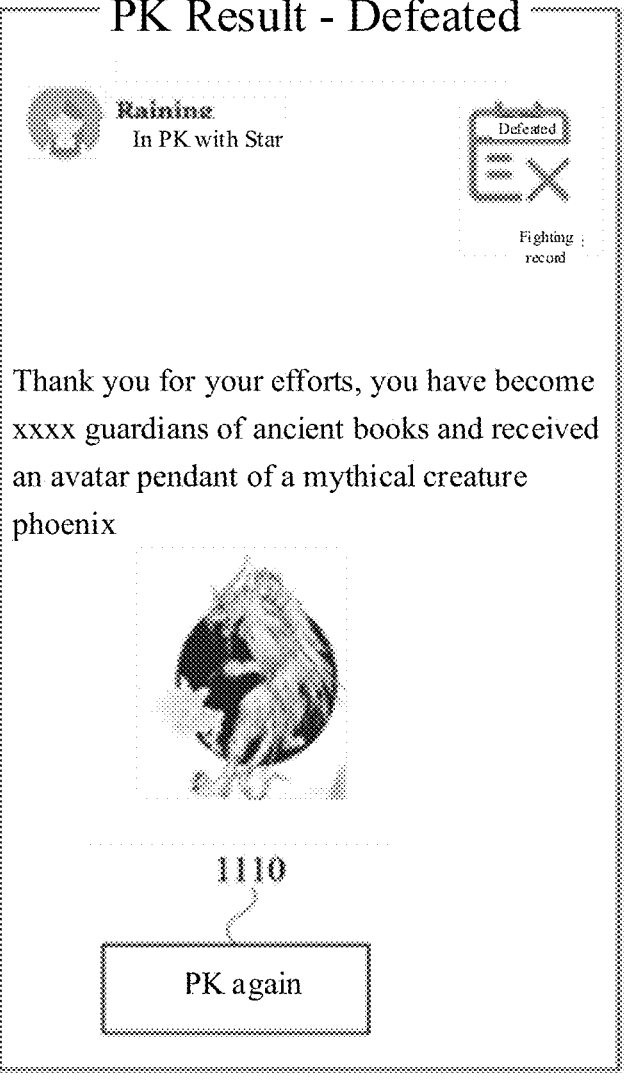
FIG. 10 is a schematic diagram of a PK result interface in embodiments of the present disclosure.

If the mythical creature B of the second user is defeated and the mythical creature A of the first user wins, a PK result interface shown in FIG. 10 is displayed, which includes a ninth control 1110 (PK again). If the second user triggers the ninth control (PK again) 1110, it returns to the interface shown in FIG. 3, namely the interaction information interacted again between the first object (mythical creature A) and the second object (mythical creature B) is regenerated.

On the basis of the above embodiments, FIG. 11 is a flow schematic diagram of a content distribution method, the content distribution method is applied to a server for processing the target content (including the first target content and the second target content) in the above embodiments. This method may be executed by a content distribution apparatus, the apparatus may be achieved by using a mode of software and/or hardware, and the apparatus may be configured in an electronic device, such as the server.

As shown in FIG. 11, the method may specifically include the following steps:

Step 1210, receiving the second target content.

Step 1220, pushing the second target content to a third user, the third user and the second user satisfy a preset relationship.

Specifically, when the second user triggers the second preset operation for the second target content, the video application of the second user uploads the second target content to the server. When the server receives the second target content, the second target content is pushed. For example, the second target content is pushed to the video application of the third user who is a friend of the second user, as to guide the third user to interact with the second object of the second user by the second target content. Thus, an interaction chain is formed, and under the guidance of the first target content posted by the first user, the second user interacts with the first user, and then the second user posts the second target content. The third user is guided to interact with the second user by the second target content. It may be understood that the third user and the first user may be the same user.

The content distribution method provided in this embodiment is used to process the second target content in the above interaction method, specifically the second target content is received. The second target content is pushed to the third user. The third user and the second user satisfy the preset relationship, as to guide the third user to interact with the second user by the second target content, to achieve the pushing of the second target content and enrich the interaction playing methods between the different users.

FIG. 12 is a schematic structural diagram of an interaction apparatus in an embodiment of the present disclosure. As shown in FIG. 12, the interaction apparatus specifically includes: a first display module 1310 and a second display module 1320.

The first display module 1310 is configured to display a first target content, the first target content includes a first object associated with a first user, and the first target content ised by the first user; and the second display module 1320 is configured to, in response to a first preset operation triggered for the first target content, display a second target content, and the second target content includes a second object associated with the first object.

Optionally, the second target content further includes the first object, so that the second object interacts with the first object.

Optionally, the second target content further includes interaction information between the first object and the second object.

Optionally, the apparatus further includes: a generating module, configured to, in response to a triggering on a preset control, regenerate the interaction information interacted again between the first object and the second object, and the second target content includes the preset control.

Optionally, the second display module includes: a first display unit, configured to in response to a triggering on the first target content, display a selection interface of the second object; and a second display unit, configured to, in response to a selecting for the second object based on the selection interface, display the second target content.

Optionally, the first display unit is specifically configured to: in response to a triggering on a preset inlet, display a first interface based on information of a second user, if the information of the second user is preset information, the first interface is a selection interface of the second object.

Optionally, the apparatus further includes: a posting module, configured to, in response to a second preset operation triggered for the second target content, post the second target content, the second target content is configured to support a third user to generate an interaction content based on the second object.

Optionally, the first target content and the second target content are video contents, and the first object and the second object are target objects in the video contents.

Optionally, the second user and the first user satisfy a preset relationship.

The interaction apparatus provided in the embodiments of the present disclosure may perform the steps in the interaction method provided in the method embodiments of the present disclosure, and has the advantages of executing the steps and the beneficial effects, it is not repeatedly described here.

FIG. 13 is a schematic structural diagram of a content distribution apparatus in embodiments of the present disclosure. As shown in FIG. 13, the content distribution apparatus specifically includes: a receiving module 1410 and a pushing module 1420.

The receiving module 1410, is configured to receive the second target content; pushing module 1420, is configured to push the second target content to a third user, the third user and the second user satisfy a preset relationship.

The content distribution apparatus provided by the embodiments of the present disclosure can execute the steps in the content distribution method provided by the method embodiments of the present disclosure. The execution steps and beneficial effects will not be described again here.

Figure 14:
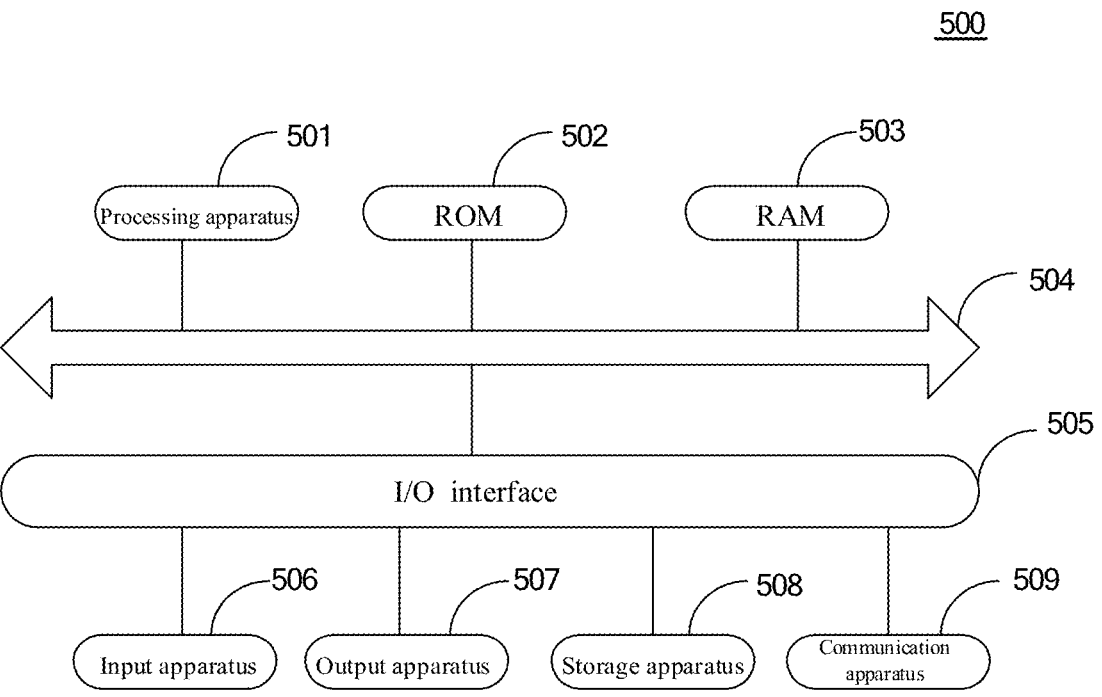
FIG. 14 is a schematic structural diagram of an electronic device in embodiments of the present disclosure.

FIG. 14 is a schematic structural diagram of an electronic device in an embodiment of the present disclosure. FIG. 14 is specifically referred below, and it shows the structure schematic diagram suitable for achieving the electronic device 500 in the embodiment of the present disclosure. The electronic device 500 in the embodiment of the present disclosure may include but not limited to a mobile terminal such as a mobile phone, a notebook computer, a digital radio broadcasting receiver, a personal digital assistant (PDA), a portable android device (PAD), a portable multimedia player (PMP), a vehicle terminal (such as a vehicle navigation terminal), and a wearable electronic device, and a fixed terminal such as a digital television (TV), a desktop computer, and a smart home device. The electronic device shown in FIG. 14 is only an example and should not impose any limitations on the functions and use scopes of the embodiments of the present disclosure.

As shown in FIG. 14, the electronic device 500 may include a processing apparatus (such as a central processing unit, and a graphics processor) 501, it may execute various appropriate actions and processes according to a program stored in a read-only memory (ROM) 502 or a program loaded from a storage apparatus 508 to a random-access memory (RAM) 503. In RAM 503, various programs and data required for operations of the electronic device 500 are also stored. The processing apparatus 501, ROM 502, and RAM 503 are connected to each other by a bus 504. An input/output (I/O) interface 505 is also connected to the bus 504.

Typically, the following apparatuses may be connected to the I/O interface 505: an input apparatus 506 such as a touch screen, a touchpad, a keyboard, a mouse, a camera, a microphone, an accelerometer, and a gyroscope; an output apparatus 507 such as a liquid crystal display (LCD), a loudspeaker, and a vibrator; a storage apparatus 508 such as a magnetic tape, and a hard disk drive; and a communication apparatus 509. The communication apparatus 509 may allow the electronic device 500 to wireless-communicate or wire-communicate with other devices so as to exchange data. Although FIG. 14 shows the electronic device 500 with various apparatuses, it should be understood that it is not required to implement or possess all the apparatuses shown. Alternatively, it may implement or possess the more or less apparatuses.

Specifically, according to the embodiment of the present disclosure, the process described above with reference to the flow diagram may be achieved as a computer software program. For example, an embodiment of the present disclosure includes a computer program product, it includes a computer program loaded on a non-transient computer-readable medium, and the computer program contains a program code for executing the method shown in the flow diagram. In such an embodiment, the computer program may be downloaded and installed from the network by the communication apparatus 509, or installed from the storage apparatus 508, or installed from ROM 502. When the computer program is executed by the processing apparatus 501, the above functions defined in the method in the embodiments of the present disclosure are executed.

It should be noted that the above computer-readable medium in the present disclosure may be a computer-readable signal medium, a computer-readable storage medium, or any combinations of the two. The computer-readable storage medium may be, for example, but not limited to, a system, an apparatus or a device of electricity, magnetism, light, electromagnetism, infrared, or semiconductor, or any combinations of the above. More specific examples of the computer-readable storage medium may include but not limited to: an electric connector with one or more wires, a portable computer magnetic disk, a hard disk drive, a random access memory (RAM), a read-only memory (ROM), an erasable programmable read-only memory (EPROM or flash memory), an optical fiber, a portable compact disk read-only memory (CD-ROM), an optical storage device, a magnetic storage device or any suitable combinations of the above. In the present disclosure, the computer-readable storage medium may be any visible medium that contains or stores a program, and the program may be used by an instruction executive system, apparatus or device or used in combination with it. In the present disclosure, the computer-readable signal medium may include a data signal propagated in a baseband or as a part of a carrier wave, it carries the computer-readable program code. The data signal propagated in this way may adopt various forms, including but not limited to an electromagnetic signal, an optical signal, or any suitable combinations of the above. The computer-readable signal medium may also be any computer-readable medium other than the computer-readable storage medium, and the computer-readable signal medium may send, propagate, or transmit the program used by the instruction executive system, apparatus or device or in combination with it. The program code contained on the computer-readable medium may be transmitted by using any suitable medium, including but not limited to: a wire, an optical cable, a radio frequency (RF) or the like, or any suitable combinations of the above.

In some implementation modes, a client and a server may be communicated by using any currently known or future-developed network protocols such as a HyperText Transfer Protocol (HTTP), and may interconnect with any form or medium of digital data communication (such as a communication network). Examples of the communication network include a local area network ("LAN"), a wide area network ("WAN"), an internet work (such as the Internet), and an end-to-end network (such as an ad hoc end-to-end network), as well as any currently known or future-developed networks.

The above computer-readable medium may be contained in the above electronic device; and it may also exist separately without being assembled into the electronic device.

The above computer-readable medium carries one or more programs, and when the above one or more programs are executed by the electronic device, the electronic device is used to:

display a first target content, the first target content includes a first object associated with a first user, and the first target content is posted by the first user; and in response to a first preset operation triggered for the first target content, display a second target content, the second target content includes a second object associated with the first object.

Optionally, when the above one or more programs are executed by the electronic device, the electronic device may also execute other steps described in the above embodiments.

The computer program code for executing the operation of the present disclosure may be written in one or more programming languages or combinations thereof, the above programming language includes but not limited to object-oriented programming languages such as Java, Smalltalk, and C++, and also includes conventional procedural programming languages such as a "C" language or a similar programming language. The program code may be completely executed on the user's computer, partially executed on the user's computer, executed as a standalone software package, partially executed on the user's computer and partially executed on a remote computer, or completely executed on the remote computer or server. In the case involving the remote computer, the remote computer may be connected to the user's computer by any types of networks, including LAN or WAN, or may be connected to an external computer (such as connected by using an internet service provider through the Internet).

The flow diagrams and the block diagrams in the drawings show possibly achieved system architectures, functions, and operations of systems, methods, and computer program products according to various embodiments of the present disclosure. At this point, each box in the flow diagram or the block diagram may represent a module, a program segment, or a part of a code, the module, the program segment, or a part of the code contains one or more executable instructions for achieving the specified logical functions. It should also be noted that in some alternative implementations, the function indicated in the box may also occur in a different order from those indicated in the drawings. For example, two consecutively represented boxes may actually be executed basically in parallel, and sometimes it may also be executed in an opposite order, this depends on the function involved. It should also be noted that each box in the block diagram and/or the flow diagram, as well as combinations of the boxes in the block diagram and/or the flow diagram, may be achieved by using a dedicated hardware-based system that performs the specified function or operation, or may be achieved by using combinations of dedicated hardware and computer instructions.

The involved units described in the embodiments of the present disclosure may be achieved by a mode of software, or may be achieved by a mode of hardware. The name of the unit does not constitute a limitation for the unit itself in some cases.

The functions described above in this article may be at least partially executed by one or more hardware logic components. For example, non-limiting exemplary types of the hardware logic component that may be used include: a field programmable gate array (FPGA), an application specific integrated circuit (ASIC), an application specific standard product (ASSP), a system on chip (SOC), a complex programmable logic device (CPLD) and the like.

In the context of the present disclosure, the machine-readable medium may be a visible medium, and it may contain or store a program for use by or in combination with an instruction executive system, apparatus, or device. The machine-readable medium may be a machine-readable signal medium or a machine-readable storage medium. The machine-readable medium may include but not limited to an electronic, magnetic, optical, electromagnetic, infrared, or semiconductor system, apparatus, or device, or any suitable combinations of the above. More specific examples of the machine-readable storage medium may include an electric connector based on one or more wires, a portable computer disk, a hard disk drive, RAM, ROM, EPROM (or a flash memory), an optical fiber, CD-ROM, an optical storage device, a magnetic storage device, or any suitable combinations of the above.

According to one or more embodiments of the present disclosure, the present disclosure provides an interaction method, applied to a client of a second user, and the method includes: displaying a first target content, the first target content includes a first object associated with a first user, and the first target content is posted by the first user; and in response to a first preset operation triggered for the first target content, displaying a second target content, the second target content includes a second object associated with the first object.

According to one or more embodiments of the present disclosure, in the interaction method provided by the present disclosure, optionally, the second target content further includes the first object, so that the second object interacts with the first object.

According to one or more embodiments of the present disclosure, in the interaction method provided by the present disclosure, optionally, the second target content further includes interaction information between the first object and the second object.

According to one or more embodiments of the present disclosure, in the interaction method provided by the present disclosure, optionally, the method further includes: in response to a triggering on a preset control, regenerating the interaction information interacted again between the first object and the second object, the second target content includes the preset control.

According to one or more embodiments of the present disclosure, in the interaction method provided by the present disclosure, optionally, in response to the first preset operation triggered for the first target content, displaying the second target content includes: in response to the triggering on the first target content, displaying a selection interface of the second object; and in response to a selecting for the second object based on the selection interface, displaying the second target content.

According to one or more embodiments of the present disclosure, in the interaction method provided by the present disclosure, optionally, in response to the triggering on the first target content, displaying the selection interface of the second object includes: in response to a triggering on a preset inlet, displaying a first interface based on information of a second user, if the information of the second user is preset information, the first interface is a selection interface of the second object.

According to one or more embodiments of the present disclosure, in the interaction method provided by the present disclosure, optionally, the method further includes: in response to a second preset operation triggered for the second target content, posting the second target content, the second target content is configured to support a third user to generate an interaction content based on the second object.

According to one or more embodiments of the present disclosure, in the interaction method provided by the present disclosure, optionally, the first target content and the second target content are video contents, and the first object and the second object are target objects in the video contents.

According to one or more embodiments of the present disclosure, in the interaction method provided by the present disclosure, optionally, the second user and the first user satisfy a preset relationship.

According to one or more embodiments of the present disclosure, the present disclosure provides a content distribution method, the content distribution method is used to process a second target content in the above interaction method, and applied to a server, and the method includes: receiving the second target content; and pushing the second to a third user, the third user and the second user satisfy a preset relationship.

According to one or more embodiments of the present disclosure, the present disclosure provides an interaction apparatus, the interaction apparatus is integrated into a client of a second user, and the apparatus includes: a first display module, configured to display a first target content, the first target content includes a first object associated with a first user, and the first target content is posted by the first user; and a second display module, configured to, in response to a first preset operation triggered for the first target content, display a second target content, the second target content includes a second object associated with the first object.

According to one or more embodiments of the present disclosure, in the interaction apparatus provided by the present disclosure, optionally, the second target content further includes the first object, so that the second object interacts with the first object.

According to one or more embodiments of the present disclosure, in the interaction apparatus provided by the present disclosure, optionally, the second target content further includes interaction information between the first object and the second object.

According to one or more embodiments of the present disclosure, in the interaction apparatus provided by the present disclosure, optionally, the apparatus further includes: a generating module, configured to, in response to a triggering on a preset control, regenerate the interaction information interacted again between the first object and the second object, and the second target content includes the preset control.

According to one or more embodiments of the present disclosure, in the interaction apparatus provided by the present disclosure, optionally, the second display module includes: a first display unit, configured to, in response to a triggering on the first target content, display a selection interface of the second object; and a second display unit, configured to, in response to a selecting for the second object based on the selection interface, display the second target content.

According to one or more embodiments of the present disclosure, in the interaction apparatus provided by the present disclosure, optionally, the first display unit is specifically used to: in response to a triggering on a preset inlet, display a first interface based on information of a second user, if the information of the second user is preset information, the first interface is a selection interface of the second object.

According to one or more embodiments of the present disclosure, in the interaction apparatus provided by the present disclosure, optionally, the apparatus further includes: a posting module, configured to, in response to a second preset operation triggered for the second target content, post the second target content, the second target content is configured to support a third user to generate an interaction content based on the second object.

According to one or more embodiments of the present disclosure, in the interaction apparatus provided by the present disclosure, optionally, the first target content and the second target content are video contents, and the first object and the second object are target objects in the video contents.

According to one or more embodiments of the present disclosure, in the interaction apparatus provided by the present disclosure, optionally, the second user and the first user satisfy a preset relationship.

According to one or more embodiments of the present disclosure, the present disclosure provides a content distribution apparatus, the content distribution apparatus is used to process a second target content in the above interaction method, and is integrated into a server, and the apparatus includes: a receiving module, configured to receive the second target content; and a pushing module, configured to push the second target content to a third user, the third user and the second user satisfy a preset relationship.

According to one or more embodiments of the present disclosure, the present disclosure provides an electronic device, and the electronic device includes:

one or more processors;

and a memory, configured to store one or more programs;

when the one or more programs are executed by the one or more processors, the one or more processors are caused to implement any one of the methods provided by the present disclosure.

According to one or more embodiments of the present disclosure, the present disclosure provides a computer-readable storage medium, on which a computer program is stored, and any one of the methods provided by the present disclosure is achieved when the program is executed by a processor.

An embodiment of the present disclosure further provides a computer program product, the computer program product includes a computer program or instruction, and the computer program or instruction achieves the method described above when executed by the processor.

The above descriptions are only preferred embodiments of the present disclosure and explanations of the technical principles used. Those skilled in the art should understand that the scope of the present disclosure involved in the present disclosure is not limited to the technical schemes formed by specific combinations of the above technical features, but also encompasses other technical schemes formed by arbitrary combinations of the above technical features or equivalent features thereof without departing from the above disclosed concepts. For example, a technical scheme formed by replacing the above features with (but not limited to) technical features with similar functions disclosed in the present disclosure.

In addition, although each operation is depicted in a specific order, this should not be understood as requiring these operations to be executed in the specific order shown or in a sequential order. In certain environments, multitasking and parallel processing may be advantageous. Similarly, although a plurality of specific implementation details is contained in the above discussion, these should not be construed as limiting the scope of the present disclosure. Some features described in the context of individual embodiments may also be combined and implemented in a single embodiment. On the contrary, various features described in the context of a single embodiment may also be implemented individually or implemented in a plurality of the embodiments in the form of any suitable sub-combinations.

Although the subject matter is already described in language specific to structural features and/or method logical actions, it should be understood that the subject matter limited in the appended claims may not necessarily be limited to the specific features or actions described above. On the contrary, the specific features and actions described above are only exemplary forms of achieving the claims.

The invention claimed is:

1. An interaction method for a client of a second user, wherein the method comprises:

displaying a first content, wherein the first content comprises a first object associated with a first user, and the first content is posted by the first user; and displaying a second content in response to a first preset operation triggered for the first content, wherein the second content comprises a second object associated with the first object, and the second object is generated based on the first object.

2. The method according to claim 1, wherein the second content further comprises the first object, so that the second object interacts with the first object.

3. The method according to claim 1, wherein the second content further comprises interaction information between the first object and the second object.

4. The method according to claim 3, wherein the method further comprises:

regenerating the interaction information between the first object and the second object which interact again in response to a triggering on a preset control, wherein the second content comprises the preset control.

5. The method according to claim 1, wherein displaying the second content in response to the first preset operation triggered for the first content comprises:

displaying a selection interface of the second object in response to a triggering on the first content; and displaying the second content in response to a selecting for the second object based on the selection interface.

6. The method according to claim 5, wherein displaying the selection interface of the second object in response to the triggering on the first content comprises:

displaying a first interface based on information of a second user in response to the triggering on the preset inlet, wherein when the information of the second user is preset information, the first interface is a selection interface of the second object.

7. The method according to claim 1, wherein the method further comprises:

posting the second content in response to a second preset operation triggered for the second content, wherein the second content is configured to support a third user to generate an interaction content based on the second object.

8. The method according to claim 1, wherein the first content and the second content are video contents, and the first object and the second object are objects in the video contents.

9. The method according to claim 1, wherein the second user and the first user satisfy a preset relationship.

10. A content distribution method for a server, used for processing a second content in the interaction method according to claim 1, and the method comprises:

receiving the second content;

pushing the second content to a third user, wherein the third user and the second user satisfy a preset relationship.

11. An electronic device, comprising:
one or more processors; and
a memory, configured to store one or more programs;
when the one or more programs are executed by the one or more processors, the one or more processors are caused to:
display a first content, wherein the first content comprises a first object associated with a first user, and the first content is posted by the first user; and
display a second content in response to a first preset operation triggered for the first content, wherein the second content comprises a second object associated with the first object, and the second object is generated based on the first object.

12. The electronic device according to claim 11, wherein the second content further comprises the first object, so that the first object interacts with the second object.

13. The electronic device according to claim 11, wherein the second content further comprises interaction information between the first object and the second object.

14. The electronic device according to claim 13, wherein the one or more processors are further caused to:
regenerate the interaction information between the first object and the second object which interact again in response to a triggering on a preset control, wherein the second content comprises the preset control.

15. The electronic device according to claim 11, wherein displaying the second content in response to the first preset operation triggered for the first target content comprises:
displaying a selection interface of the second object in response to a triggering on the first content; and
displaying the second content in response to a selecting for the second object based on the selection interface.

16. The electronic device according to claim 15, wherein displaying the selection interface of the second object in response to the triggering on the first content comprises:
displaying a first interface based on information of a second user in response to the triggering on the preset inlet, wherein when the information of the second user is preset information, the first interface is a selection interface of the second object.

17. The electronic device according to claim 11, wherein the one or more processors are further caused to:
post the second content in response to a second preset operation triggered for the second content, wherein the second content is configured to support a third user to generate an interaction content based on the second object.

18. The electronic device according to claim 11, wherein the first content and the second content are video contents, and the first object and the second object are objects in the video contents.

19. The electronic device according to claim 11, wherein the second user and the first user satisfy a preset relationship.

20. A non-transitory computer-readable storage medium, storing computer programs, when the computer programs are executed by a processor, the processor is caused to perform an interaction method for a client of a second user, wherein the method comprises:
displaying a first content, wherein the first content comprises a first object associated with a first user, and the first content is posted by the first user; and
displaying a second content in response to a first preset operation triggered for the first content, wherein the second content comprises a second object associated with the first object, and the second object is generated based on the first object.

* * * * *